(12) United States Patent
Drecq

(10) Patent No.: US 6,538,366 B1
(45) Date of Patent: Mar. 25, 2003

(54) SPARKING PLUG EQUIPPED WITH A PRESSURE SENSOR, AND COMBUSTION ENGINE EQUIPPED WITH SUCH SPARKING PLUGS

(76) Inventor: Daniel Drecq, 8, rue Octave Allaire, 78610 Saint Leger en Yvelines (FR)

( * ) Notice: Subject to any disclaimer, the term of this patent is extended or adjusted under 35 U.S.C. 154(b) by 176 days.

(21) Appl. No.: 09/636,823
(22) Filed: Aug. 14, 2000
(30) Foreign Application Priority Data
Aug. 18, 1999 (FR) .............................. 99 10592

(51) Int. Cl.⁷ .................... H01T 13/40; G01L 23/00; G01M 15/00
(52) U.S. Cl. ................ 313/141; 313/118; 313/143; 313/135; 78/114; 78/115
(58) Field of Search ............... 313/141–145, 313/118, 135; 78/114, 115

(56) References Cited

U.S. PATENT DOCUMENTS

| | | | |
|---|---|---|---|
| 2,738,677 A | | 3/1956 | Li ................................ 73/389 |
| 4,489,596 A | * | 12/1984 | Linder et al. ................ 313/137 |
| 4,969,353 A | * | 11/1990 | Steinke ......................... 73/115 |
| 5,101,659 A | * | 4/1992 | Takeuchi ....................... 73/115 |
| 5,479,817 A | * | 1/1996 | Suzuki et al. ............ 123/143 C |
| 5,703,282 A | * | 12/1997 | Kuesell et al. ................ 73/115 |
| 6,094,990 A | * | 8/2000 | Lykowski et al. .......... 73/35.12 |
| 6,105,437 A | * | 8/2000 | Klug et al. .................... 73/756 |
| 6,204,594 B1 | * | 3/2001 | Ingham ........................ 313/118 |

FOREIGN PATENT DOCUMENTS

| | | |
|---|---|---|
| EP | 0 441 157 A2 | 8/1991 |
| WO | WO 82/00520 | 2/1982 |
| WO | WO 86/06477 | 11/1986 |

* cited by examiner

Primary Examiner—Nimeshkumar D. Patel
Assistant Examiner—Sikha Roy
(74) Attorney, Agent, or Firm—Young & Thompson

(57) ABSTRACT

A sparking plug for a combustion engine, includes a metal shell with an externally threaded end part for screwing into a tapped hole in a cylinder head. The shell supports, on the inside, an insulating body, through which there passes a central electrode capable of being connected to a high tension. An annular chamber is delimited by an interior surface in the region of the threaded end part of the shell and the exterior surface of the end of the insulating body. The sparking plug also has at least one pressure sensor, and is designed to subject this sensor to the pressure of an associated combustion chamber when the sparking plug is in place. The pressure sensor is installed in the threaded end part of the shell delimiting the annular chamber radially out from the internal surface of this end part such that the geometry of the annular chamber is not altered by the presence of the sensor.

20 Claims, 5 Drawing Sheets

SPARKING PLUG EQUIPPED WITH A PRESSURE SENSOR, AND COMBUSTION ENGINE EQUIPPED WITH SUCH SPARKING PLUGS

BACKGROUND OF THE INVENTION

The invention relates to a sparking plug for a combustion engine, comprising a metal shell with an externally threaded end part for screwing into a tapped hole in a cylinder head, the shell supporting, on the inside, an insulating body, particularly one made of ceramic, through which there passes a central electrode capable of being connected to a high tension, an annular chamber being delimited by an interior surface in the region of the threaded end past of the shell and the exterior surface of the end of the insulating body, the sparking plug also being equipped with at least one pressure sensor, particularly of the resistive type, and designed to subject this sensor to the pressure of an associated combustion chamber when the sparking plug is in place.

Measuring pressure in the cylinder of a combustion engine is of great importance given the subsequent thermodynamic calculations that can be made on the basis of the pressure cycle.

The precision with which pressure is measured, and the timing of the cycle are the key factors in calculating the energy released by the combustion.

It has already been proposed for such measurement to be performed using piezo-electric sensors based on quartz crystals. The quartz crystal is compressed via the pressure obtaining in the cylinder. The application of pressure to quartz generates an amount of current, expressed in picocoulombs, which has to be amplified in a charge amplifier. This solution is simultaneously expensive in terms of the sensor and the amplifier, and difficult to implement because a drift in the miniscule amount of current frequently occurs. This type of measurement is accompanied by a procedure and frequent checks of the hardware.

Furthermore, a piezo-electric sensor gives a good representation of the difference or variation in pressure applied to the sensor, but does not give the actual or absolute value of the pressure. Calibrating this offset is always a problem.

It has therefore been proposed that piezo-electric sensors be replaced with piezo-resistive sensors. The latter have two advantages:

they give the actual value of the absolute pressure,
the output signal is very easy to amplify, using a Wheatstone bridge.

By contrast, piezo-resistive sensors have the drawback of poor temperature resistance. However, it is currently possible to obtain piezo-resistive sensors which are capable of withstanding temperatures of the order of 250° C., which is high enough for being installed in sparking plugs.

Various solutions for installing sensors, particularly piezo-resistive sensors, in sparking plugs have been proposed.

However, the installations hitherto proposed are not entirely satisfactory because they disturb the way combustion takes place and lead to measured pressure values which differ from the actual values. Certain installations involving a hole of somewhat sizeable volume for conveying the pressure onto the sensor, modify the volume of the chamber and give rise to resonant signals which are not consistent with the actual combustion phenomenon.

SUMMARY OF THE INVENTION

The object of the present invention is, mainly, to propose a way of installing the pressure sensor, particularly a piezo-resistive sensor, which avoids any appreciable modification to the way in which combustion takes place and which makes it possible to obtain measured pressure values which are as exact as possible, while at the same time adequately protecting the sensor against heat.

According to the invention, a sparking plug for a combustion engine, of the type defined hereinabove, equipped with a pressure sensor, is characterized in that the pressure sensor is installed in the threaded end part of the shell delimiting the annular chamber radially out from the internal surface of this end part such that the geometry of the annular chamber is not altered by the presence of the sensor.

As a preference, the threaded end part of the shell comprises, toward the interior, a recess for accommodating a barrel section capable of reproducing the geometry of the annular chamber; the barrel section comprises, on its external surface, a housing for the sensor which is thus enclosed in a closed space bounded by the barrel section and the wall of the recess, at least one small-diameter hole being provided in the wall of the barrel section to allow the pressure from the combustion chamber onto the sensor.

The enclosed space left for the sensor protects it against the temperature of the combustion chamber.

In an alternative form, the sensor is bonded to the external face of the housing of the barrel section and the hole opens into the said housing some distance from the sensor, so that the latter is subjected to the pressure of the combustion chamber on its opposite face to the face that is bonded to the barrel section.

In another alternative form, the sensor is bonded to the external face of the housing of the barrel section and the hole opens onto that face of the sensor which is bonded to the barrel section.

The barrel section may be bonded into the recess in the threaded end part of the shell. The sensor may be bonded into the housing in the barrel section.

In one particular embodiment, at least one ground electrode is connected to the shell and to ground, the tips of said electrodes being spaced apart by a predetermined distance. The barrel section may have at least one slot for the passage of the ground electrode(s).

The pressure sensor may be diametrically opposite the ground electrode.

The barrel section may carry a number of pressure sensors.

In another embodiment, the barrel section has at least one axial extension forming a ground electrode, the tips of the central electrode and of the ground electrode(s) being spaced apart by a predetermined distance.

Advantageously, at least one channel is pierced in the shell parallel to the axis of the sparking plug, and opens at one end into the closed space in which the sensor is housed and at its other end into a space connected to the outside, this channel allowing the passage of conducting wires to lead out the electrical signals from the pressure sensor.

At least one temperature sensor may also be provided on the barrel section.

The invention also relates to a combustion engine, the cylinder or cylinders of which is or are equipped with such sparking plugs.

The invention consists, apart from the provisions set out hereinabove, in a certain number of other provisions which will be explained with regard to two particular embodiments which are described in detail with reference to the drawings appended hereto but which are not in any way restrictive.

DETAILED DESCRIPTION OF THE PREFERRED EMBODIMENTS

Figure 1:
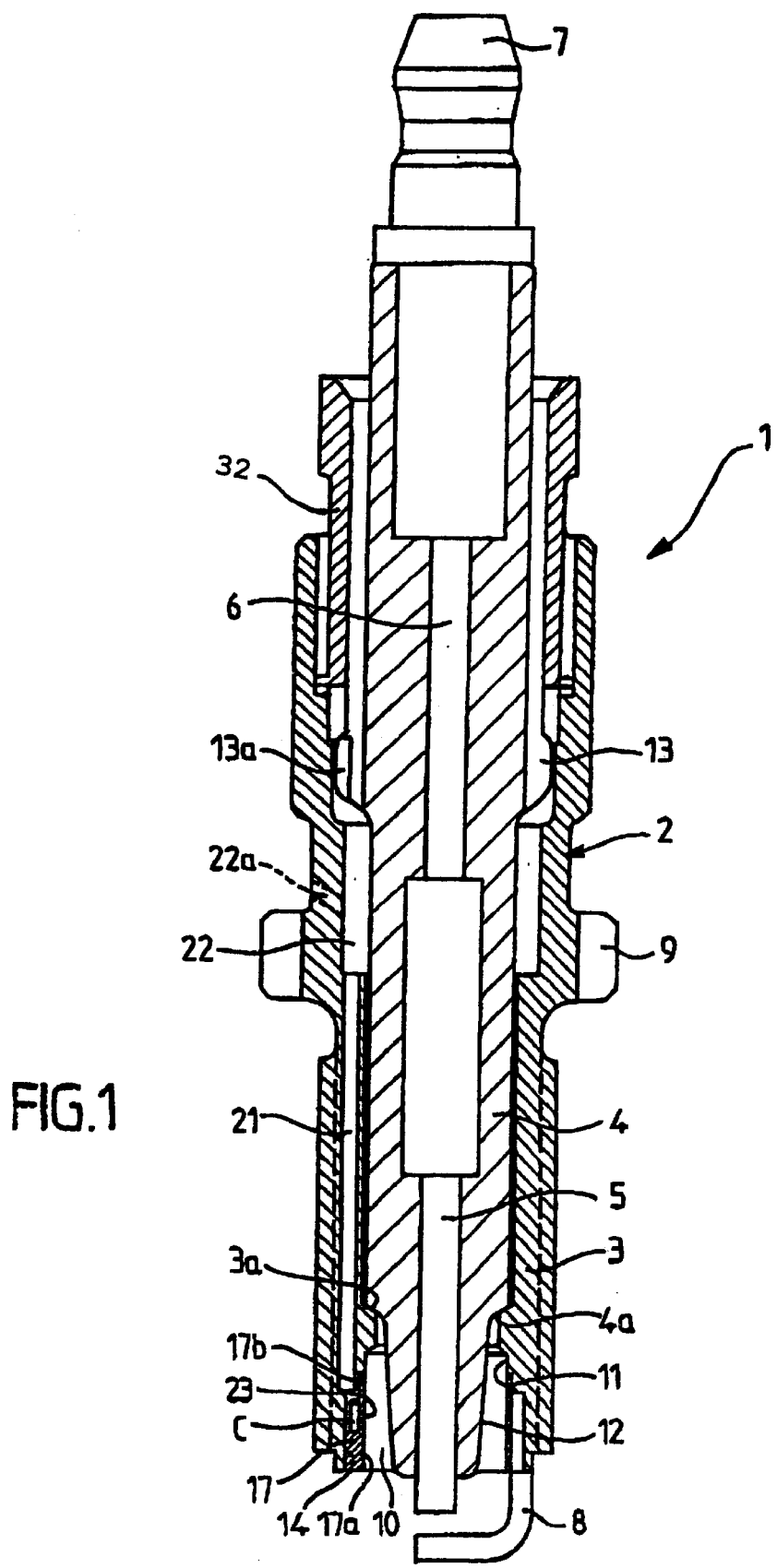
FIG. 1 of these drawings is a schematic vertical axial section, with part viewed from the outside, of a sparking plug according to a first embodiment of the invention.
Figure 2:
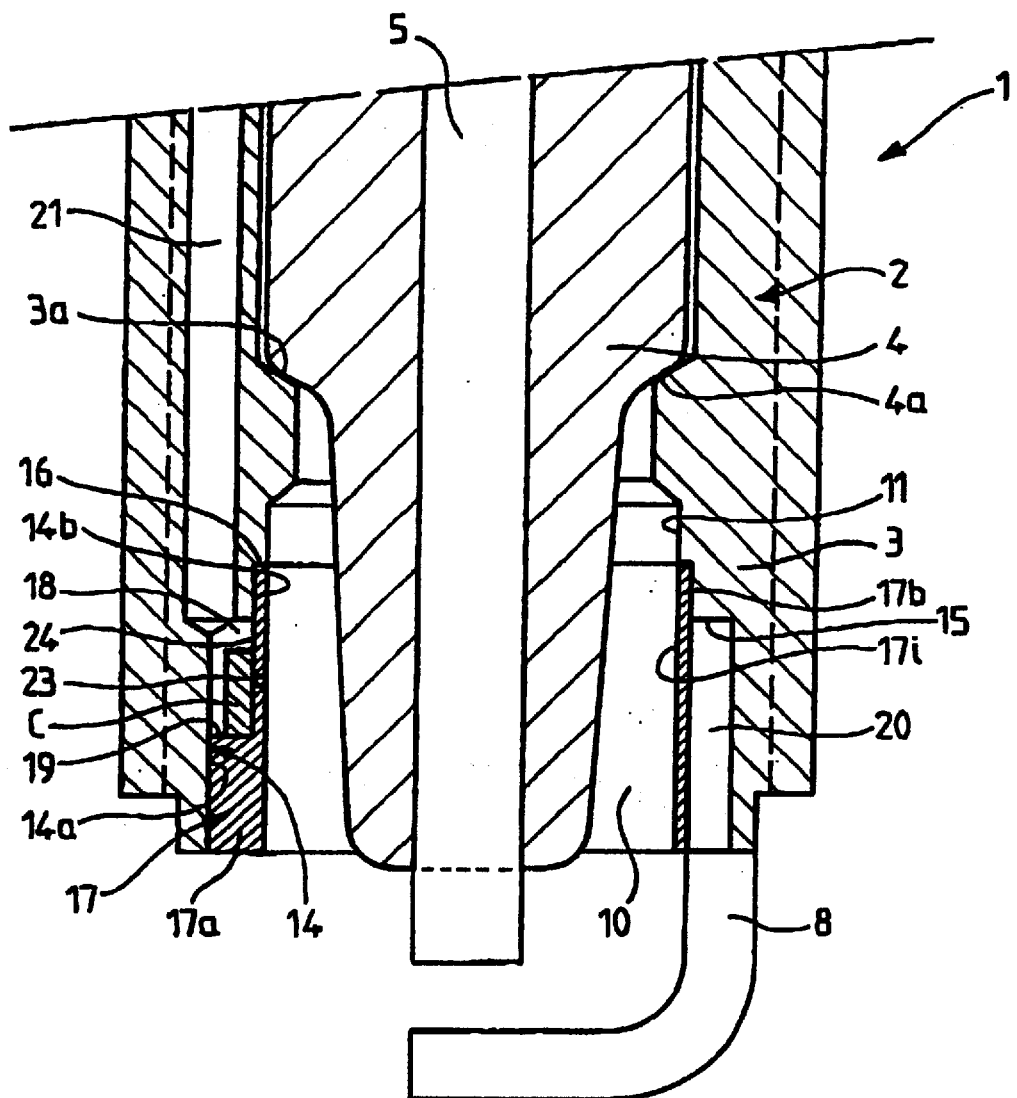
FIG. 2 is a view to a larger scale of the end of the sparking plug with the tips of the electrodes and the pressure sensor.
Figure 3:
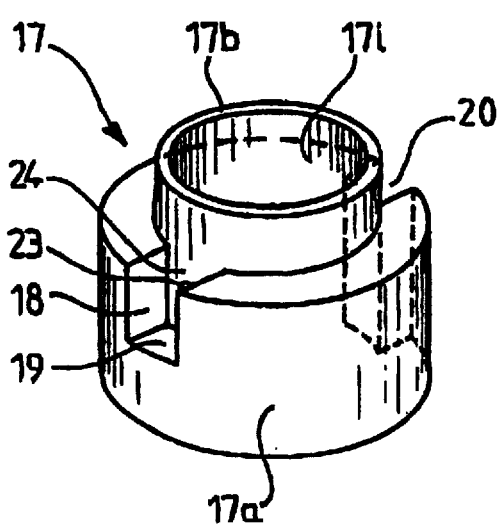
FIG. 3 is a perspective view of the barrel section.

Referring to FIG. 1 of the drawings, there can be seen a sparking plug 1 for a combustion engine, according to a first embodiment of the invention, comprising a metal shell 2 with an externally threaded end part 3 for screwing into a tapped hole in a cylinder head (not depicted) which opens into the combustion chamber of a cylinder (not depicted).

The shell 2 supports, on the inside, an insulating body 4 made of ceramic, through which there passes a central electrode 5 connected, by a connection stem 6, to a terminal 7 to which an electrical high tension is applied, at appropriate moments.

A second electrode 8, connected to the shell 2, consists of a metal bar, bent inward at a right angle. The tips of the two electrodes are spaced apart by a predetermined distance for producing a spark. The electrode 8 is connected to the ground via the shell 2 screwed into the cylinder head. In the example depicted in FIG. 1, the shell 2 comprises, roughly mid-way along its length, a nut-shaped part 9 for screwing and unscrewing. Sealing between the shell 2 and the cylinder head occurs on the opposite side of the nut 9 to the terminal 7.

An annular chamber 10, opening toward the combustion chamber when the sparking plug 1 is in place on the cylinder head, is delimited by the cylindrical interior surface 11 of the threaded part 3 and by the exterior surface 12 of that end of the insulating body 4 which is near the tip of the electrode 5. In the embodiment depicted, the surface 12 is slightly frustoconical, its small base lying toward the tip of the electrode 5.

The insulating body 4 has a frustoconical shoulder 4a resting, in a sealed manner, for example with the interposition of a copper gasket, against another, interior, frustoconical shoulder 3a of the threaded part 3. The insulating body 4 can be immobilized in the shell 2 by a sleeve tube 32 resting axially against a widened portion 13 of the body 4, the sleeve tube 32 being engaged and immobilized in the shell 2 at the opposite end to the tips of the electrodes.

The sparking plug 1 is equipped with a piezoresistive pressure sensor C. This pressure sensor C is installed in the end part 3 of the shell delimiting the annular chamber 10, radially outside the internal surface 11 so that the geometry of the annular chamber is not altered by the presence of the sensor.

In other words, the internal surface 11 of the annular chamber 10 of a sparking plug equipped with a sensor according to the invention keeps the same cylindrical shape and the same dimensions as in a sparking plug which is not equipped with the sensor C. There is therefore no alteration to the microgeometry of the space 10 which means that the way in which combustion takes place is not modified.

According to an advantageous solution, the end part 3 comprises, on the inside, a stepped recess 14 comprising a first cylindrical bore 14a coaxial with the central electrode 5. This bore 14a opens toward the combustion chamber and, at the other end, extends as far as an inward radial step 15. A second bore 14b, of smaller diameter than the bore 14a, follows on from the step 15 over a shorter axial length than does the bore 14a. The end of this second part 14b is marked by an inward radial step 16 where the bore meets the cylindrical surface 11 of the end bore of the part 3.

A metal barrel section 17 is designed to be housed in the recess 14 and to reproduce the geometry of the annular chamber 10. The barrel section 17 fills the recess 14 so that the interior cylindrical surface 17i of the barrel section is aligned with the upper part of the cylindrical surface 11 that it reconstructs and extends as far as the end which is open toward the combustion chamber.

The barrel section 17 comprises a sleeve tube 17a which can be housed in the part 14a of the recess 14, and which is surmounted by a thinner collar 17b which fills the part 14b of the recess. There is a housing 18, for example produced by milling, on the external cylindrical surface of the barrel section 17, to accommodate the sensor C. The housing 18 is bounded, on the combustion chamber side, by a shoulder 19, while it is open at the opposite end.

A slot 20, parallel to the axis of the barrel section 17, is machined, for example in a position diametrically opposite the housing 18, in the external surface of the barrel section to allow the passage of the electrode 8, before it is bent over, when mounting the barrel section 17 in the shell 2 of the sparking plug.

The barrel section 17 may be fixed into the recess 14 of the shell 2 by bonding.

At least one channel 21 is pierced in the shell, parallel to the axis of the sparking plug to open, at one end, into the part 14a of the recess 14. At its other end, the channel 21 opens into a space 22 connected to the outside.

The connection between the space 22 and the outside may be made via at least one slot 13a made in the widened portion 13. According to another possibility, the connecting wires for the sensor C may be led out through an oblique hole 22a made in the wall of the shell 2 near the nut 9, on the opposite side of this nut to the threaded end 3.

The sensor C may be fixed into the housing 18 by bonding. On mounting, the sensor connecting wires are engaged in the channel 21, while the barrel section 17 is angularly oriented in such a way that the housing 18 is centered on the channel 21. The electrode 8 is not yet bent inward, which means that the barrel section 17 can be slid in and bonded into the recess 14, the electrode 8 passing along the slot 20. After the barrel section 17 has been fitted, the electrode 8 can be bent over at a right angle.

At least one small-diameter hole 23, this diameter being of the order of a few tenths of a millimeter, is made in the thin part 24 of the barrel section bounding the housing 18 on the inside. As a preference, a number of holes 23 are made, to establish a communication between the housing 18 and the chamber 10, so that the sensor C is subjected to the pressure obtaining in the combustion chamber. The hole or holes 23 present no problem of resonance because their diameter is extremely small and their length is short because the thickness of the part 24 of the wall is small, of the order of a few tenths of a millimeter.

According to the invention, the sensor C is housed in an enclosed space, protected from the temperature of the combustion chamber.

A number of pressure sensor cells may be fitted at the periphery of the barrel section 17, before it is bonded to the sparking plug shell, in a similar way to the way described in respect of the housing 18 by having additional housings 18a.

Figure 9:
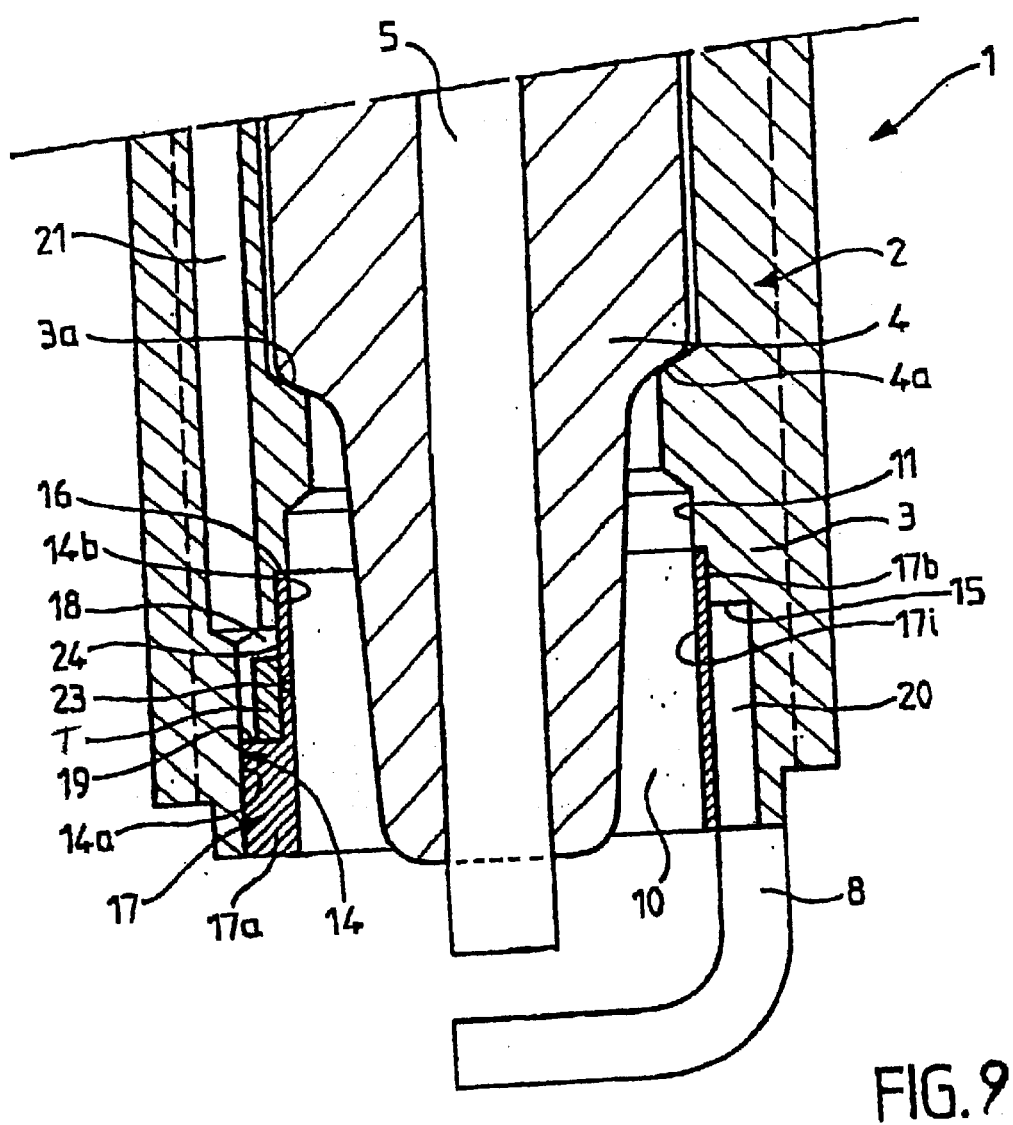
FIG. 9 is a view similar to FIG. 2 with a temperature sensor.
Figure 8:
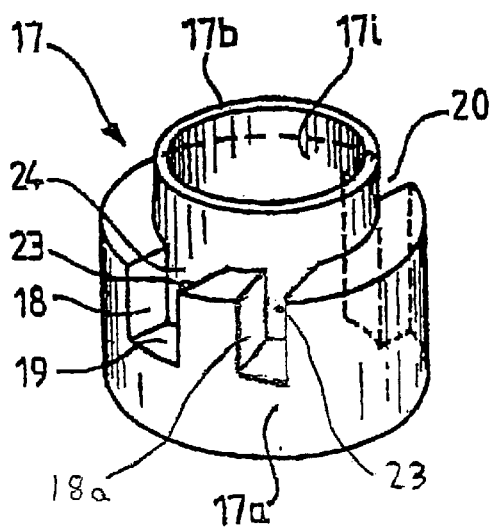
FIG. 8 is a perspective view of the barrel section showing two housing recesses.

Likewise, temperature sensors T may be fitted on the barrel section 17 before it is bonded in. Sensors T have a similar configuration to pressure sensors C as seen in FIG. 9.

Passing and leading out the sensor connecting wires through channels such as 21 which can be sealed up, makes it possible to get around problems of temperature and sealing.

FIGS. 4 to 7 depict a second embodiment of the sparking plug of the invention, in which the elements which are identical or similar to those of the first embodiment carry the same reference numerals increased by one hundred.

The sparking plug 101 according to the second embodiment comprises a ground electrode 108 which is as one with the barrel section 117 and which consists of a metal bar running roughly parallel to the axis of the sparking plug, from the cylindrical wall of the barrel section 117 toward the outside of the sparking plug, with its end portion bent inward at a right angle. The tips of the two electrodes 108 and 105 are spaced apart by a predetermined distance so as to produce a spark. The electrode 108 is connected to ground via the shell 102 screwed into the cylinder head.

The annular chamber 110, opening toward the combustion chamber when the sparking plug 101 is in place in the cylinder head, is delimited by the cylindrical interior surface 117i of the barrel section 117 and by the frustoconical exterior surface 112 of the end of the insulating body 104 that is near the tip of the electrode 105. The sparking plug 101 also has an opposite end having a terminal 107. The insulating body 104 can be immobilized in the shell 102 by a sleeve tube 132 resting axially against a widened portion 113 of the body 104.

The pressure sensor C is installed in the end part 103 of the shell delimiting the annular chamber 110, radially outside the internal surface 117i of the barrel section 117, so that the geometry of the annular chamber is not modified by the presence of the sensor. This end part 103 has, toward the inside, a recess 114 against the lateral surface of which the exterior cylindrical part of the barrel section 117 is bonded. The barrel section 117 completely fills the recess 114 so that its interior cylindrical surface 117i is aligned with the internal part of the shell 103, above the recess 114.

A housing 118, roughly in the shape of a L is produced, for example by milling, on the cylindrical external surface of the barrel section 117. The long leg of this housing 118 runs parallel to the axis of the sparking plug and opens toward the inside of the sparking plug, away from the electrode 108. The other, short, leg 119 of the housing 118 extends in an arc of a circle and the hole 123 opens into the short leg 119, a distance away from the sensor C which is housed in the long leg of the housing 118. The hole 123 is formed in a thin wall portion 124 of the barrel section 117, this thin wall portion 124 being defined at the Lshaped housing 118. Of course, there could be a number of holes 123, provided they did not open at the sensor C.

At least one channel is pierced in the shell 102, parallel to the axis of the sparking plug to open, at one end, into the recess 114 and, at its opposite end, into a space 122 connected to the outside. This channel is intended to accommodate a connecting lead 121 for the sensor C, the lead 121 being intended to pass through an oblique hole made in the wall of the shell 102 near the nut 109, on the opposite side of this nut to the threaded end 103. As best visible in FIG. 5, the connecting lead consists of a sheath 121, bonded or brazed to the cylindrical external surface of the barrel section 117 and a number of measurement wires 121a which run along inside the sheath. A seal 125 is placed in the housing 118, to provide sealing between the wires 121a and the sensor C.

Figures 4, 5:
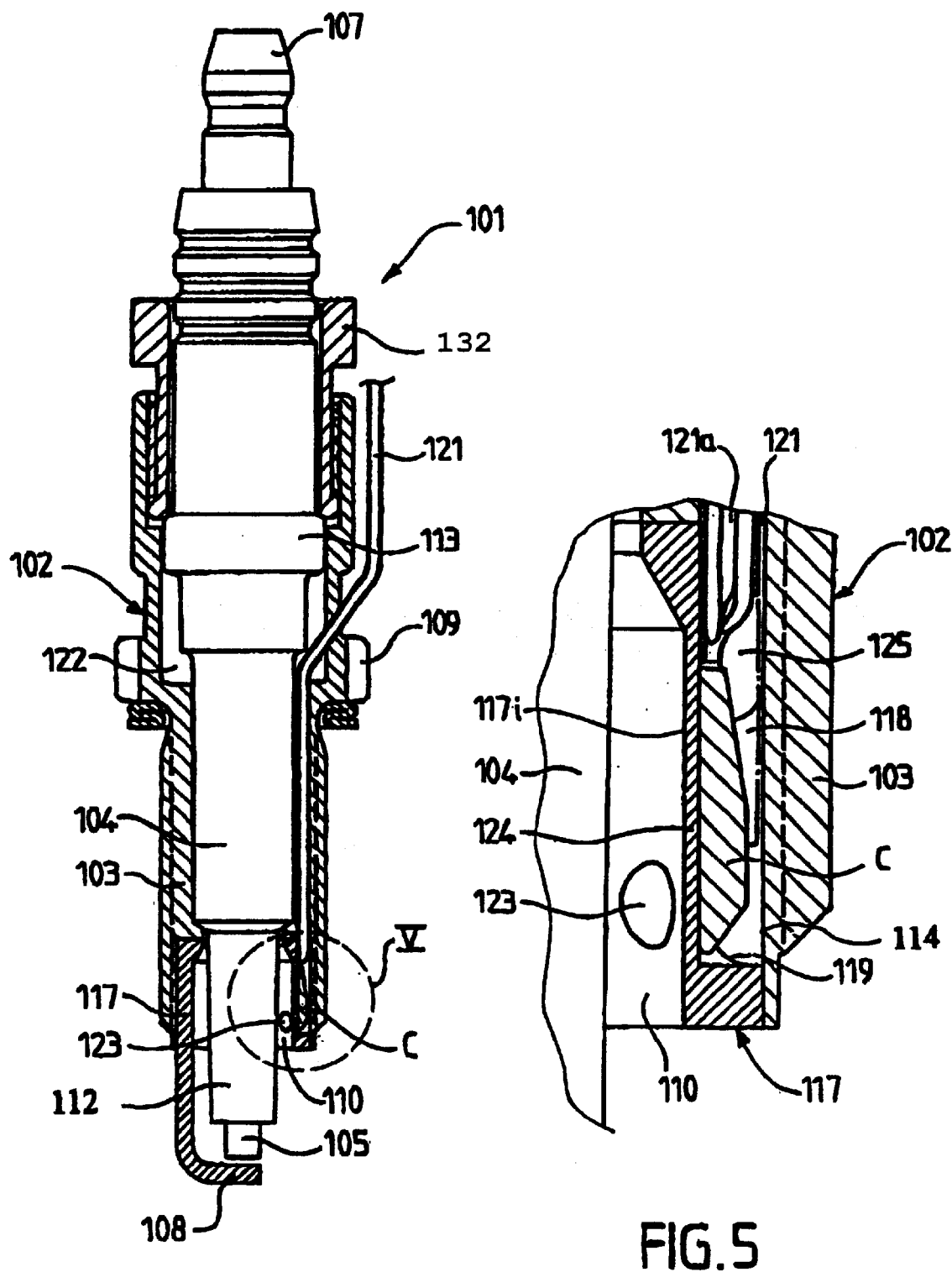
FIG. 4 is a view similar to FIG. 1, but depicting a second embodiment of the sparking plug of the invention.
FIG. 5 is an enlarged view of a detail ringed in FIG. 4 and identified by the numeral V.
Figure 6:
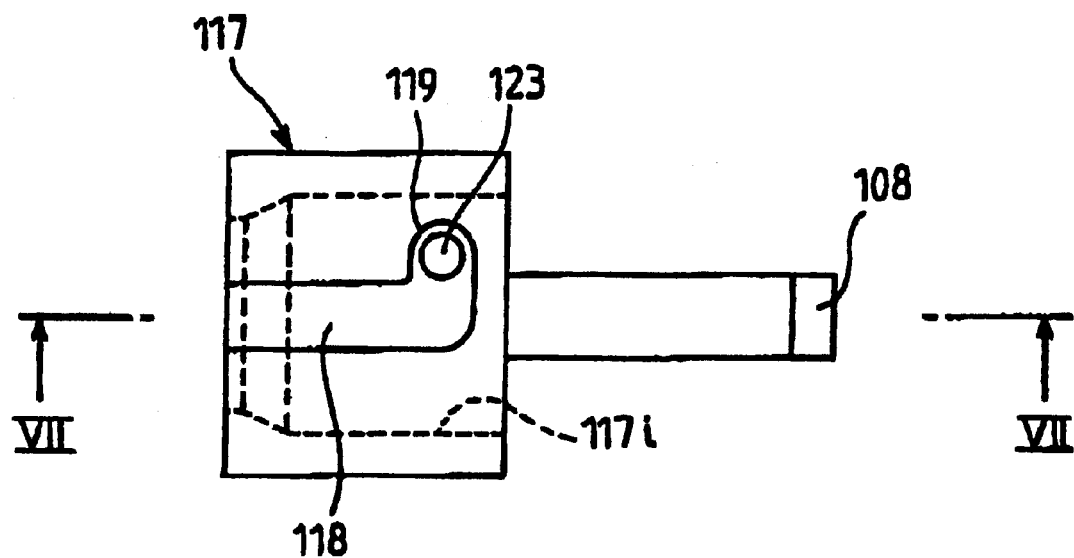
FIG. 6 is an elevation of the barrel section of FIG. 4.
Figure 7:
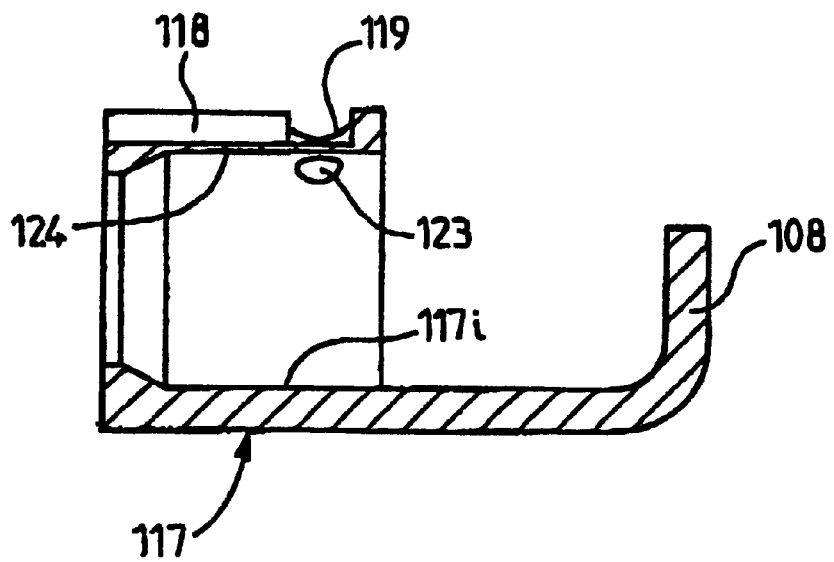
FIG. 7 is a view in section on the line VII—VII of FIG. 6.

FIG. 4 shows a gasket pressing against the part 109 of the shell 102 of the sparking plug and intended to press against the cylinder head.

The fact of providing the ground electrode 108 directly on the barrel section 117 allows for easier machining. Of course, it is possible to envisage a sparking plug with a number of ground electrodes or alternatively a sparking plug with annular ground electrode, as is the case of sparking plugs for competition engines.

In the case of a sparking plug with a single ground electrode, illustrated in FIGS. 1 to 7, the spark can arc axially between the lower end of the electrode 5, 105 and the ground electrode 8, 108 facing it. In the case of a sparking plug with a number of ground electrodes, these have their lower end bent radially toward the central electrode, so that the spark or sparks arc radially. In the case of sparking plugs for competition engines, with an annular ground electrode, the barrel section has an internal collar projecting radially toward the central electrode so that the spark can arc at any point whatsoever on the periphery of the central electrode.

What is claimed is:

1. A sparking plug for a combustion engine, comprising:
    a metal shell with an externally threaded end part for screwing into a tapped hole in a cylinder head;
    an insulating body inside and supported by said shell;
    a central electrode passing through said insulating body for connection to a high tension;
    an annular chamber being delimited by an internal surface of the shell, in the region of the threaded end part, and an exterior surface of an end of the insulating body;
    at least one pressure sensor (C), said sparking plug subjecting said pressure sensor to a pressure of an associated combustion chamber when the sparking plug is in place, the pressure sensor (C) being installed in the threaded end part of the shell delimiting the annular chamber, radially outward from the internal surface of the threaded end part such that a geometry of the annular chamber is not altered by the presence of the sensor,
    wherein the threaded end part of the shell comprises a recess for accommodating a barrel section having an internal cylindrical surface that is aligned with an upper part of the internal surface of the threaded end part of the shell so that the barrel section reproduces the geometry of the annular chamber, said internal cylindrical surface extending to an end of the annular chamber adjacent to the combustion chamber.

2. Sparking plug according to claim 1, characterized in that the sensor (C) is a piezo-resistive sensor.

3. Sparking plug according to claim 1, wherein the barrel section comprises, on an external peripheral surface, a recessed housing for the sensor so that the sensor is thus enclosed in a closed space bounded by the barrel section and a wall of the recess, and wherein at least one small diameter hole is provided in a thin part of the wall of the barrel section to allow the pressure from the combustion chamber onto the sensor.

4. Sparking plug according to claim 1, characterized in that the recess (14) is stepped and has a first cylindrical bore (14a) coaxial with the central electrode (5), this bore (14a) opening to the combustion chamber and, at the other end, extending as far as a inward radial step (15), and a second bore (14b), of smaller diameter than the bore (14a) which follows on from the step (15), the end of this second bore (14b) being marked by an inward radial step (16) where the bore meets the cylindrical surface (11) of the end bore of the part (3).

5. Sparking plug according to claim 4, characterized in that the barrel section (17) comprises a sleeve tube (17a) which is housed in the part (14a) of the recess (14) and which is surmounted by a thinner collar (17b) which fills the part (14b) of the recess, the housing (18) being formed on the cylindrical external surface of the barrel section (17).

6. Sparking plug according to claim 3, characterized in that the barrel section (17, 117) is bonded into the recess (14, 114) of the threaded end part (3, 103) of the shell.

7. Sparking plug according to claim 3, characterized in that the sensor (C) is bonded to the external face of the housing (118) of the barrel section (117) and the hole (123) opens into the said housing some distance from the sensor, so that the latter is subjected to the pressure of the combustion chamber on its opposite face to the face that is bonded to the barrel section.

8. Sparking plug according to claim 3, characterized in that the sensor (C) is bonded to the external face of the housing (18) of the barrel section (17) and the hole (23) opens onto that face of the sensor which is bonded to the barrel section.

9. Sparking plug according to claim 1, in which at least one ground electrode (8) is connected to the shell and to ground, the tips of said electrodes (5, 8) being spaced apart by a predetermined distance, characterized in that the barrel section (17) has at least one slot (20) for the passage of the ground electrode(s) (8).

10. Sparking plug according to claim 1, characterized in that the barrel section (117) has at least one axial extension forming a ground electrode (108), the tips of the central electrode (105) and of the ground electrode(s) (108) being spaced apart by a predetermined distance.

11. Sparking plug according to claim 1, characterized in that at least one channel (21, 121) is pierced in the shell (2, 102) parallel to the axis of the sparking plug, and opens at one end into the closed space in which the sensor (C) is housed and at its other end into a space (22, 122) connected to the outside, this channel allowing the passage of conducting wires (121a) to lead out the electrical signals from the pressure sensor.

12. Sparking plug according to claim 1, characterized in that at least one temperature sensor is provided on the barrel section.

13. Combustion engine, the cylinder or cylinders of which is or are equipped with sparking plugs according to claim 1.

14. Sparking plug according to claim 2, wherein the barrel section (17, 117) comprises, on its external surface, a housing (18, 118) for the sensor which is thus enclosed in a closed space bounded by the barrel section (17, 117) and the wall of the recess (14, 114), at least one small-diameter hole (23, 123) being provided in a thin part (24, 124) of the wall of the barrel section to allow the pressure from the combustion chamber onto the sensor.

15. Sparking plug according to claim 2, wherein the recess (14) is stepped and has a first cylindrical bore (14a) coaxial with the central electrode (5), this bore (14a) opening to the combustion chamber and, at the other end, extending as far as an inward radial step (15), and a second bore (14b), of smaller diameter than the bore (14a) which follows on from the step (15), the end of this second bore (14b) being marked by an inward radial step (16) where the bore meets the cylindrical surface (11) of the end bore of the part (3).

16. Sparking plug according to claim 3, wherein the recess (14) is stepped and has a first cylindrical bore (14a) coaxial with the central electrode (5), this bore (14a) opening to the combustion chamber and, at the other end, extending as far as an inward radial step (15), and a second bore (14b), of smaller diameter than the bore (14a) which follows on from the step (15), the end of this second bore (14b) being marked by an inward radial step (16) where the bore meets the cylindrical surface (11) of the end bore of the part (3).

17. Sparking plug according to claim 4, wherein the barrel section (17, 117) is bonded into the recess (14, 114) of the threaded end part (3, 103) of the shell.

18. Sparking plug according to claim 2, in which at least one ground electrode (8) is connected to the shell and to ground, the tips of said electrodes (5, 8) being spaced apart by a predetermined distance, wherein the barrel section (17) has at least one slot (20) for the passage of the ground electrode(s) (8).

19. Sparking plug according to claim 3, in which at least one ground electrode (8) is connected to the shell and to ground, the tips of said electrodes (5, 8) being spaced apart by a predetermined distance, wherein the barrel section (17) has at least one slot (20) for the passage of the ground electrode(s) (8).

20. A sparking plug for a combustion engine, comprising:
a longitudinally extending shell having an externally threaded end part;
an annular chamber in the threaded end part;
a ferrule in said annular chamber, said ferrule having an annular first part and a second part partially surrounding said first part, said second part having a thickness greater than a thickness of said first part,
said ferrule having at least one radial bore in said first part and at least one recess in said second part, said second part contacting an inner wall of said annular chamber and being immediately adjacent an end of said shell that is in contact with a combustion chamber of the engine when the sparking plug is installed in the engine; and
a pressure sensor in said at least one recess.

* * * * *